Patented May 24, 1927.

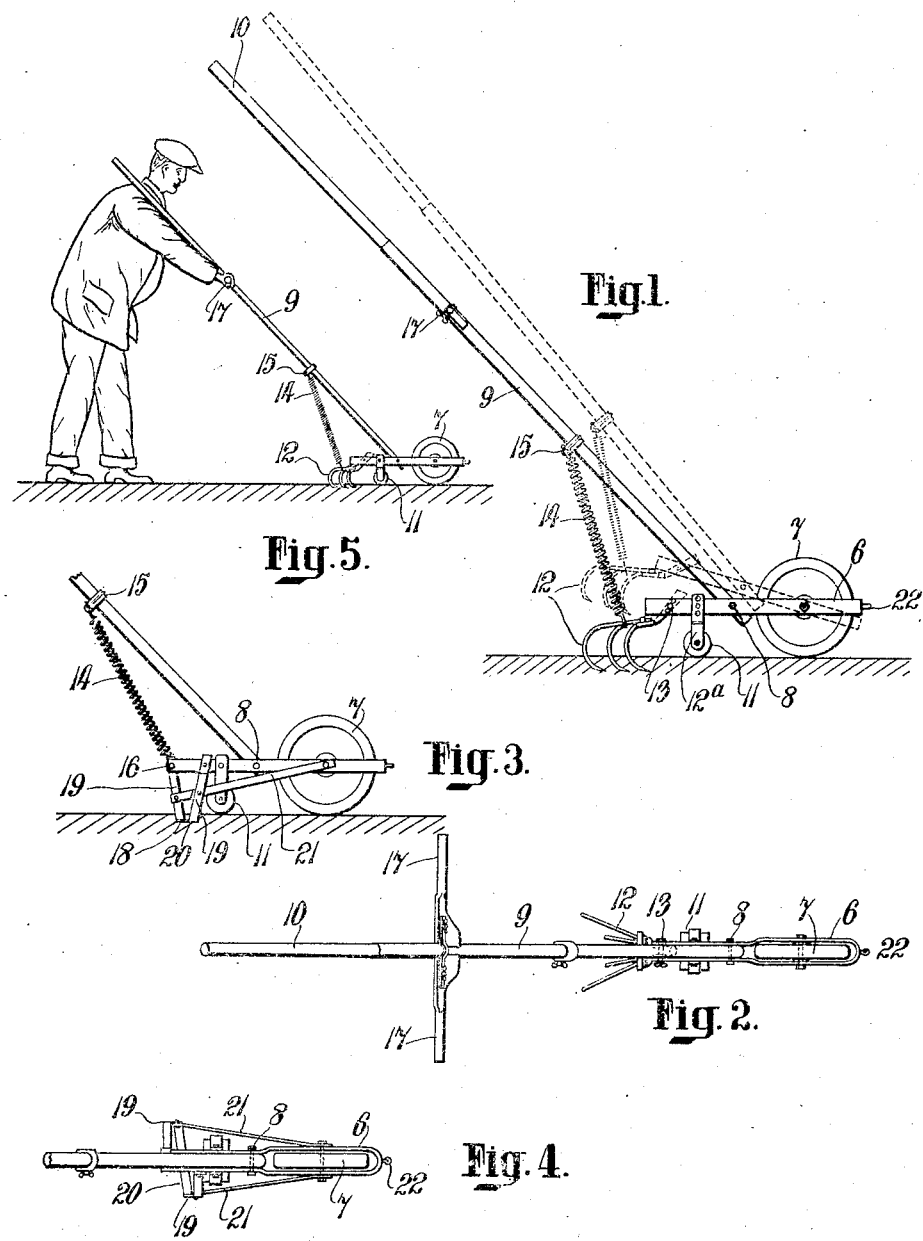

1,629,915

UNITED STATES PATENT OFFICE.

JOHN HAMPSON, OF LONDON, ENGLAND.

AGRICULTURAL IMPLEMENT.

Application filed February 20, 1925, Serial No. 10,678, and in Great Britain November 7, 1924.

This invention relates to agricultural and other implements and particularly to the manner in which they are controlled and operated and has for its object to provide a manipulating handle therefor which is adapted in use to bear on the shoulder or shoulders or other suitable part of the user whilst another portion is formed as a hand grip for the manipulation of the implement.

In general implements made according to the invention comprise a fixed or movable tool or tools or the like carried by a suitable frame preferably provided with a front wheel or wheels. The lower end of a handle of suitable form and length is movably connected to the frame preferably by a pivoted joint and at or towards the rear or other suitable part the frame carries the fixed or movable tool or tools or the like. The upper end of the handle is adapted to come on to one or both shoulders of the user and a hand grip for one or both hands is provided on the handle, preferably adjustable and projecting on each side thereof, whilst spring means also connect the frame and the handle in suitable positions. Rear guiding means may also be carried by the frame comprising a wheel, roller or other guide adapted to be adjusted vertically and in some cases horizontally.

In using the implement the upper end of handle is located on one shoulder, or if divided, on both shoulders, and the hand grips grasped by the hands, which press downwards and brings the tool or tools into the operative position, against the action of the spring. Upon moving forwards the front wheel revolves and the tools perform their work being guided by the handle and if moving tools, they may be driven from the front wheel. Upon ceasing to press on the handle the tools are automatically raised by the spring means.

The invention is applicable to a variety of implements such for example in agricultural implements as cultivators, weeders, cleaners, rakes, ploughs, harrows, bankers, drills, seeders, closers, combined drills, seeders and closers and many other devices. It can also be used for cutters, mowers, sweepers, turners, lawn markers, floor cleaners and polishers, and a variety of similar devices.

In use especially for agricultural implements the tools may be interchangeable to enable one device to be utilized for a variety of purposes.

And in order that the invention may be better understood it will now be described with reference to the accompanying drawings in which:—

Fig. 1 is a side elevation of one form of agricultural implement made according to the invention.

Fig. 2 is a plan of Fig. 1.

Fig. 3 is a fragmentary side elevation of the implement shewn in Figs. 1 and 2 but with a different tool mounted in position.

Fig. 4 is a plan of Fig. 3, and

Fig. 5 is a diagram to a smaller scale shewing the implement in use.

In the drawings 6 is a frame formed from strip steel or other suitable material and carrying at the front a spindle for a front wheel 7. 8 is a pivot to the rear of the wheel 7, for the lower end of a long handle 9 which comes between the sides of the frame. This handle may be of any suitable material for instance hardwood, but in the forms shewn is a metal tube having a detachable upper extension 10 of hardwood fitted into the open upper end. 11 is a wheel or roller carried by a bracket 12$^a$ adjustably connected to the frame 6 and 12 is a five pronged cultivating tool fixed to the rear of the frame by a bolt 13. 14 is a helical tension spring between the rear of the frame 6 and a clip 15 on the handle 9 the position of which clip is adjustable. In the form shewn on the drawing the lower end of the spring is formed as a hook and in Fig. 1 this hook engages around the middle prong of the tool 12, whilst in Fig. 3 it engages a bolt 16 carried by the two sides of the frame 6.

The combined handle is of the desired length and the upper end is adapted to come on the shoulder of the user and may be provided with an encircling sleeve (not shewn) forming a contact making pad. 17 are two hand grips mounted on the handle 9 by a suitable clamp so that their position may be adjusted to suit the particular user.

To use the implement the handle is placed on the shoulder and the hand grips 17 grasped. In this position the implement rests on its front wheel 7 with the rear roller 11 and the tool 12 raised as shewn in the dotted position Fig. 1. By leaning forward and bearing down on the hand grips 17 the tool 12 is dug into the ground to a depth permitted by the rear roller 11 see full line position Fig. 1 and Fig. 5 and upon forward travel the necessary work is performed. The tool 12 is automatically raised when required by taking the pressure off the hand grips 17 and permitting the spring 14 to raise the rear of the frame and in this way it is possible to move backwards with the tools raised. The depth of cut or penetration of the tool 12 depends upon the adjustment of the bracket 12$^a$ carrying the rear roller 11.

Interchangeable tools can be used in this form of the device so that it can function as a plough, harrow, weeder, cultivator, cleaner, rake, banker, drill, seeder, closer or combined drill, seeder and closer, cutter or other suitable agricultural tool. For banking in the cultivation of celery and other vegetables the wheels and tools may be so arranged that both sides of a bank are simultaneously acted upon. For a combined drill, seeder and closer the opening tool or tools would be arranged in front and then the seeder which could be driven from the front wheel and afterwards the closing tool or tools would operate the necessary parts being carried by the framework.

Figs. 3 and 4 shew views where the cultivator 12 is replaced by a weeder or cutter 18, although if required both the cultivator 12 and weeder 18 could be used simultaneously. The weeding or cutting tool comprises a strip of steel having upright portions 19 attached to the sides of the frame 6 by bolts, connected by a horizontal portion 20 one end of which comes nearer the front than the other. The front edge of this portion 20 is sharpened and thus an inclined cutter is formed. 21 are ties or stays for the tool connecting the uprights 19 to the spindle of the front wheel.

22 is a draw ring or the like at the front of the frame 6 permitting the tool to be pulled or drawn by a horse, manual or other power when required, the operator at the rear controlling the tool or tools by the handle as before.

Although a helical tension spring has been shewn on the drawings it is obvious this could be replaced by other suitable spring elements for instance spiral or coiled springs with arm like extensions located at the pivot 8 and tending to lift the tools as in the previous construction.

An extremely simple form of implement constructed according to the invention comprises a tool, such as a cultivator, carried by the handle at its lower portion. In such a tool the lower end of the handle is pivoted to the wheel axle and may have a wheel or roller on each side. To the rear of the pivot is disposed the tool which is suitably connected to the lower part of the handle.

Where rotary or movable tools or the like are employed such for example as in lawn mowers, brooms, polishers or otherwise the necessary movement can be imparted from the front wheel through any convenient mechanism and gearing. In the case of mowers, brooms and the like the cutting or sweeping roller or the like can be arranged at an angle other than a right angle to the path of travel.

In all cases the tools or equivalent parts as well as the wheels or rollers can be adjustably mounted to allow them to be brought into any desired positions. When using the device, the spring absorbs shocks which are thus not communicated to the shoulder; the implement is further guidable to any particular point for action, with the tool out of use whilst at the desired point it can be readily used, this is of particular advantage for cutting vegetables or weeding.

What I claim and desire to secure by Letters Patent of the United States of America is:—

An implement for agricultural and other purposes comprising a longitudinally extending handle, an elongated U shaped framework formed from strip metal, between the limbs of which in an intermediate position the lower end of the handle is pivotally mounted, a running wheel pivotally mounted between the limbs of the U with its pivot parallel to the pivot of the handle and between this last mentioned pivot and the bend of the U, an operative tool carried by the limbs of the U between the free ends thereof and the pivot of the handle, means adjustably attached to the handle in an intermediate position to be gripped by the hands of the user, the whole arrangement permitting the upper end of the handle to be fulcrumed upon the shoulder of the user while pushing the tool in a forward direction for the purposes set forth.

In witness whereof I affix my signature.

JOHN HAMPSON.